Aug. 11, 1936. A. A. BREUER Re. 20,058
METHOD OF AND APPARATUS FOR SPRAYING INSECTICIDES
Original Filed Dec. 9, 1933 2 Sheets-Sheet 1
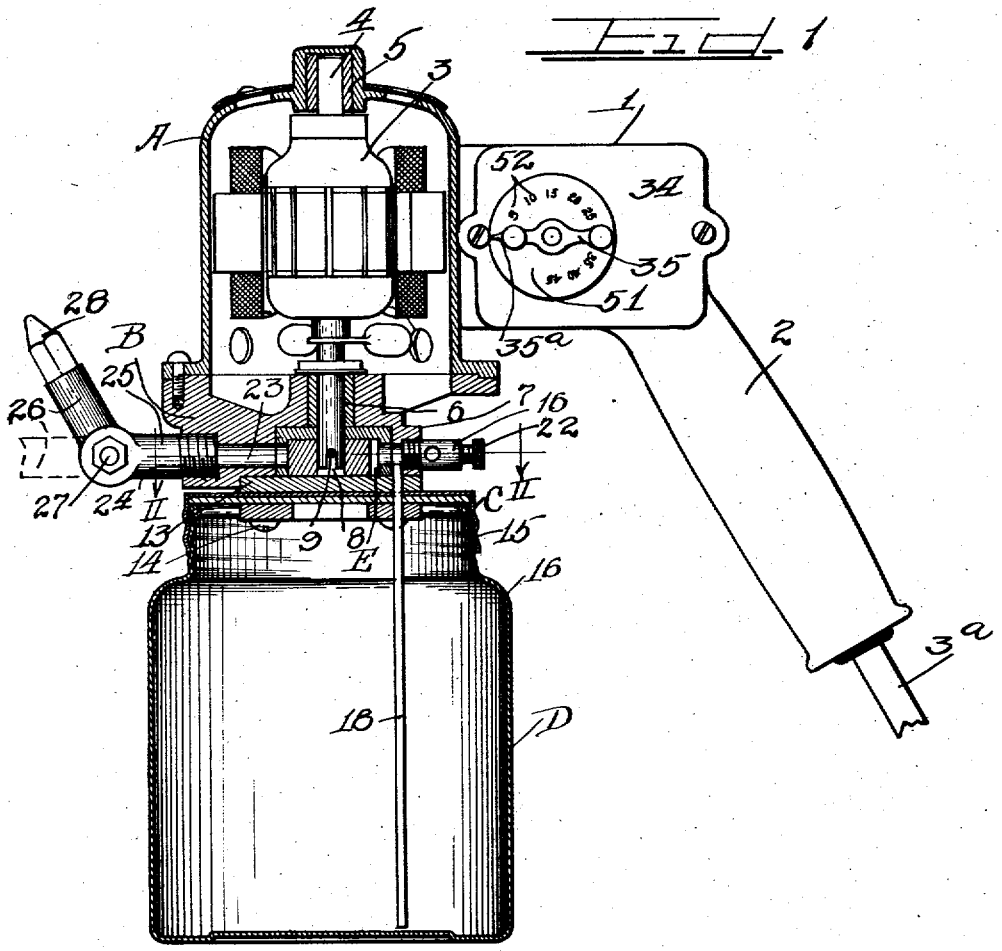
Inventor
Adam A. Breuer.
by Charles W. Hills
Atty.

Aug. 11, 1936. A. A. BREUER Re. 20,058
METHOD OF AND APPARATUS FOR SPRAYING INSECTICIDES
Original Filed Dec. 9, 1933 2 Sheets-Sheet 2
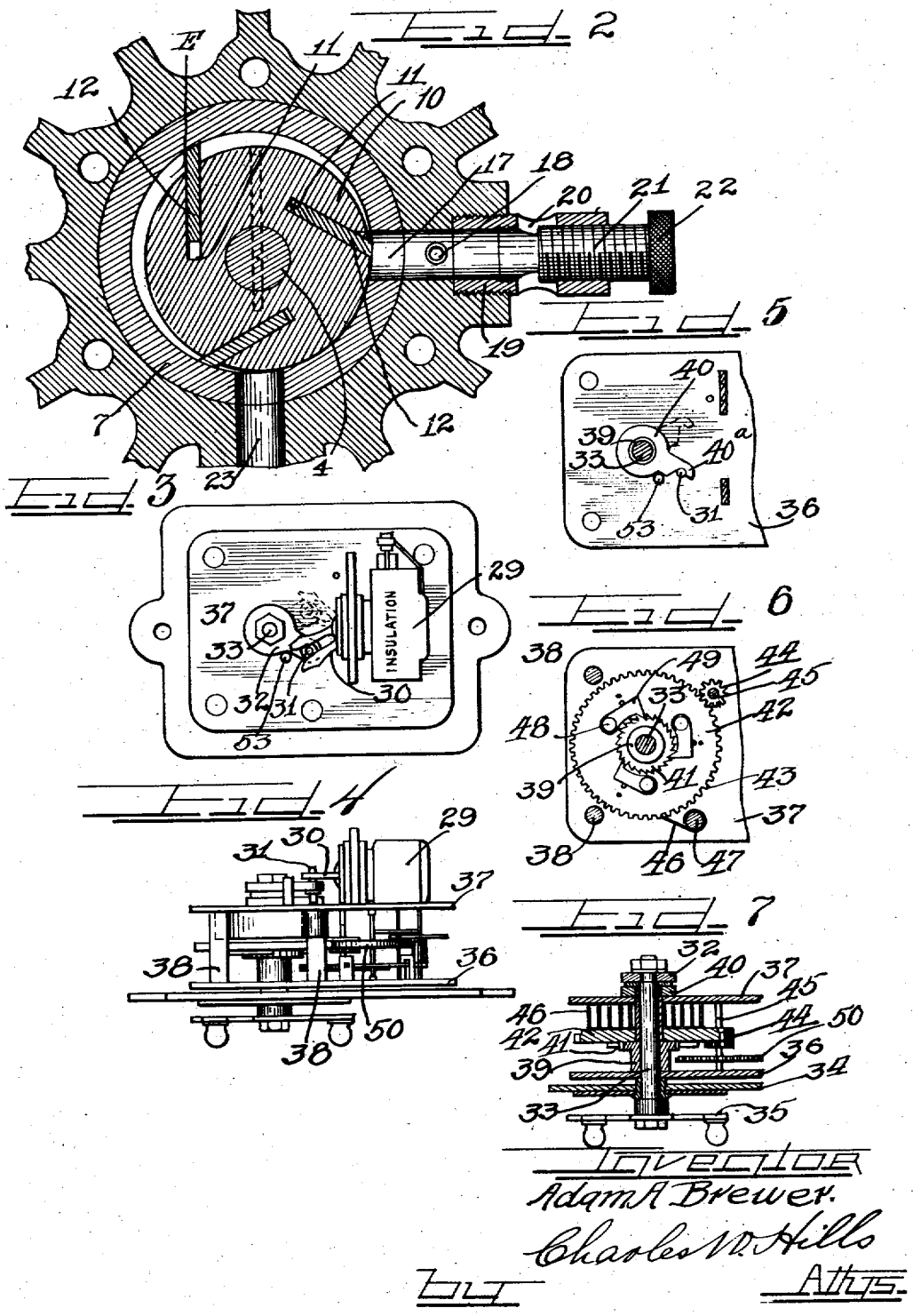

Reissued Aug. 11, 1936 Re. 20,058

UNITED STATES PATENT OFFICE 20,058

METHOD OF AND APPARATUS FOR SPRAYING INSECTICIDES

Adam A. Breuer, Chicago, Ill.

Original No. 1,990,165, dated February 5, 1935, Serial No. 701,617, December 9, 1933. Application for reissue October 17, 1935, Serial No. 45,522

6 Claims. (Cl. 299—97)

This invention has to do with a method of and apparatus for spraying insecticides, and contemplates a novel apparatus for creating spray by compression, and a novel method of compression spraying wherein the heat generated by compression is utilized to warm the insecticide prior to its discharge to the atmosphere.

The apparatus of the present invention will herein be described as preferably a small, compact portable unit which may be held in the hand of an operator or may be put on a support, such as a floor, table, shelf or the like, during use.

An object of the present invention is to provide a compact, readily portable and usable sprayer, which will discharge liquid by compressor action, in the form of a fine mist.

Another object of the invention is the provision of a portable hand sprayer wherein liquid is discharged by rotary compressor action.

A further object of the invention is to provide an apparatus having a compressor chamber into which the liquid is admitted and from which the liquid is discharged to the atmosphere in the form of a spray or mist.

A still further object of the invention is to provide a novel method of mixing fluid, such as insecticides, deodorants, and the like, with air, compressing the mixture and utilizing the heat generated by compression for warming the mixture.

Another and further object of the invention has to do with a novel method of compressing a mixture of air and fluid, such as insecticides or the like, for spray discharge, in such manner that the heat absorbed by the compressor walls during the compression of the mixture, is utilized for warming the mixture prior to its discharge to the atmosphere.

The invention further contemplates the use of a compressor including a chamber with rotary compressor means therein, for compressing and discharging therefrom, air and liquid delivered to such chamber.

The invention also contemplates the delivery of fluid to a chamber wherein such fluid is discharged as a spray, with compressor action.

Generally speaking, the apparatus of the present invention contemplates a unit, consisting of motor, motor casing, rotary compressor and liquid container, all arranged in compact, readily usable form.

The invention further contemplates an apparatus having a compressor chamber, with means for delivering to such chamber the contents of the liquid container wherein such liquid is discharged from the chamber with compressor action.

The invention further contemplates the provision of timer actuated means whereby the apparatus may be set to operate for any predetermined length of time, and, at the expiration of such time, action automatically ceases.

The above, other and further objects of the invention will be apparent from the following description, accompanying drawings and appended claims.

The accompanying drawings illustrate a sprayer, constructed in accordance with the principles of the present invention, and with which the method of the present invention may be practiced, and the views thereof are as follows:

Figure 1 is a central, vertical sectional view through a sprayer unit constructed in accordance with the principles of the present invention, showing in elevation the handle and the casing for the timer mechanism.

Figure 2 is an enlarged, horizontal, sectional view taken substantially in the plane indicated by the line II—II of Figure 1.

Figure 3 is a bottom plan view of the timer mechanism, showing the snap switch for controlling operation of the motor, and in full lines showing the parts in "off" position.

Figure 4 is a top plan view of the clock mechanism utilized herein for operating the timer mechanism of the present invention.

Figure 5 is a view, partially in elevation and partially in section, of certain details of the timer mechanism.

Figure 6 is a view, partially in elevation, and partially in section, of another part of the timer mechanism.

Figure 7 is an axial sectional view through certain portions of the timer mechanism of the present invention.

The drawings will now be explained.

The apparatus of the present invention is exemplified as embodying a motor casing A, a compressor casing B, and means designated C, for removably supporting a fluid container D in position. The parts A, B, C, and D are preferably so arranged as to lie in axially vertical alignment, to insure compactness and ready portability, and convenience in use.

To the motor casing A is attached a housing, or casing 1, for the timer mechanism, and integrally connected with such housing is a handle 2, through which are passed electrical conductors 3a to the switch mechanism within the housing 1.

The motor 3 is provided with the usual motor shaft 4 supported in bearings 5 and 6, which shaft is vertically disposed and the lower end of which passes through the bearing 6 carried in the compressor housing B.

The compressor housing is provided with a compressor chamber E, which is illustrated as formed surrounded by a cast iron bushing 7, about which the compressor casing B is cast. The lower end of the motor shaft 4 extends into the compressor chamber E where the lower end is slotted at 8 to engage a pin 9 in a rotor 10. The rotor consists of a cylindrical member having a bore through it to receive the motor shaft 4 and through which bore the pin 9 extends for cooperating with the slotted end of the motor shaft with the pin in the rotor 10 serving as a driving connection between the motor and the rotor.

The rotor is provided with a plurality of vertically disposed slots 11, of which three are shown, which intersect radii of the rotor and extend inwardly from the surface of the rotor to points near the rotor center. In these slots are vanes 12 for movement outwardly under centrifugal action, and the outer ends of which vanes are curved to conform with the contour of the inner surface of the bushing 7 of the compressor chamber. These vanes or blades move outwardly under centrifugal action whenever the rotor is rotated by the motor and move inwardly as the blades approach that portion of the motor chamber which is substantially in contact with a portion of the side surface of the rotor.

The rotor is mounted eccentrically with respect to the center of the compressor chamber as is well understood in rotary compressors of the type illustrated.

Preferably, the compressor chamber E is somewhat elliptical in outline with the rotor eccentrically arranged.

The bottom of the compressor chamber E is formed by a plate 13 which is bolted against the bottom of such chamber by suitable bolts extending into the compressor casing or casting B. Bolted to the underside of the plate 13, by bolts 14, is a threaded cap 15 adapted to threadedly receive the threaded neck 16 of the liquid container D.

Extending through a part of the compressor casing B and the bushing 7, is a duct 17 forming the air inlet for the compressor chamber E. A pipe 18 extends through suitable openings in the cap 15 and plate 13, and enters the duct 17 outwardly of the bushing 7, for supplying fluid contents of the container D to the duct. The outer end of the duct is enlarged and threaded to receive air inlet nipple 19 which has lateral openings 20 in it and a screw 21 threaded in its end for regulating air passage through the openings 20. A knurled end 22 is applied to the screw 21 for ease in manipulation of the same.

Another duct 23, constituting the discharge duct, is formed in the bushing 7 and extends through a part of the compressor casing B and terminates in an enlarged threaded opening 24, into which is threaded a part 25 of a discharge nozzle.

The discharge nozzle comprises the part 25 and a swivel end portion 26 which is connected to the part 25 by means of a bolt 27 so that the part 26 may be swung about the bolt as an axis, to discharge in various angular directions, with respect to the axis of the sprayer. The extremity of the part 26 is provided with a tip 28 for forming the sprayer discharge of the mixture discharged from the compressor chamber E as the apparatus is used.

Whenever the motor 3 is actuated, the rotor 10 is rotated and the air passing into the compressor chamber E is compressed and discharged through the tip 28 of the nozzle, carrying with it some of the fluid which is drawn into the compressor chamber E through the pipe 18. During such compression of the air, heat is generated, which heat is absorbed by the metal of the compressor chamber. The inflowing fluid from the container D absorbs some of such heat, thus tending to cool the compressor chamber and in turn becomes warmed by such heat so that the discharged mixture issuing from the tip 28 of the nozzle, is heated to some extent. This feature is important in connection with the use of insecticides, as it has been found that if the insecticide is heated to some extent, its killing power is increased many fold.

In order that the sprayer may be actuated for any predetermined length of time, without requiring the attention of an operator, there is provided timer mechanism which may be set at any predetermined length of time, within the limits of such mechanism and during such setting, the sprayer is in use.

Interposed in electrical conductors between the conductor 3a and the motor 3 is a snap switch, designated generally at 29 and actuated by a throw-over lever 30. This lever is bifurcated to receive a pin 31 carried by a swinging arm 32 which is secured to a spindle 33 of the clock mechanism. The spindle 33 passes through the cover 34, of the housing 1, and at its outer end is supplied with a handle 35 whereby the spindle may be rotated to wind the clock mechanism.

The clock mechanism is carried between two plates 36 and 37 connected together by suitable pillars 38.

A sleeve 39 surrounds the spindle 33, and extends through an opening in the back plate 37 where an arm 40 is secured to the sleeve outwardly of the back plate 37. Formed as a part of the sleeve 39 is a ratchet 41. Rotatably mounted on the sleeve 39, behind the ratchet 41, is a bull wheel 42, having ratchet teeth 43 in its periphery for meshing with a gear 44 carried on a shaft 45.

A coiled spring 46 is connected at its inner end to the sleeve 39, and at its outer end is attached to a post 47 connected to the front and back walls 36 and 37. Attached to the bull wheel 42, on pivots 48, are pawls 49 adapted to engage the ratchet wheel 41.

The usual balance wheel 50 is provided as well as other parts necessary to make an effective clock mechanism.

Disposed against the outer face of the cover 34, is a dial 51 having indicia thereon, such as 52, for indicating the length of operation of the time mechanism when the handle 35 is moved so that its pointer 35a overlies any of such indicia.

The arm 40, secured to the sleeve 39, has an extension, with a notch in it, bears against the pin 31 which is carried by the arm 32, under certain conditions.

In order to limit the movement of the arms 32 and 40, in clockwise direction, as observed in Figs. 3 and 5, a stop pin 53 is provided.

The arm 32 is fastened or otherwise secured to the shaft 33 while the arm 40 is secured to the sleeve 39.

To set the clock mechanism for closing the snap switch 29 to establish electrical connection with the motor, and also to set the clock mechanism in operation, the handle 35 is given a movement in clockwise direction, as viewed in Fig. 1, to bring its pointer 35a over the selected indicia 52 for the desired time of operation. Suppose, for instance, it is desired to operate the clock mechanism for ten minutes, whereupon the lever is moved so that its pointer overlies the figure 10. Such movement swings the arms 32 and 40, in counterclockwise direction, as viewed in Figs. 3 and 5, to move the snap switch lever 30 from the "off" position, which is the full line position of Fig. 3, to the "on" position, which is the dotted line position there shown, whereupon pressure on the handle is released. Operation of the handle in the manner described rotates the sleeve 39 in a direction to wind up the spring 46 so that when pressure on the handle 35 is released, the spring then becomes effective to set in operation the clock mechanism. As the clock mechanism operates, the engagement of the pawls 49 on the bull wheel 42 with the ratchet 41, rotates the bull wheel, in counterclockwise direction, as viewed in Fig. 6, slowly, which rotates the sleeve 39 and its attached arm 40, in clockwise direction as viewed in Fig. 5. Engagement of the extremity 40a of the arm 40 engages the pin 31 to move the pin with it and thus the lever 30 of the snap switch is moved gradually from "on" position to "off" position. When the bull wheel has been moved the length of time determined by the setting of the handle 35, the lever 30 has been moved to "off" position and the electrical circuit to the motor opened, thus stopping operation of the motor.

It may sometimes happen that the operator may desire to stop the motor in a shorter length of time than that for which the clock mechanism is set. This may be accomplished by manually turning the handle 35 in counterclockwise direction, as viewed in Fig. 1. Turning the handle in this manner causes rotation of the spindle 33 and with it its arm 32. The fact that the arm 32 carries the pin 31, which engages the lever 30 of the snap switch, will move the snap switch to "off" position even though the clock mechanism be still operating. This is an important feature as often times, for some reason, it is desired to stop the operation of the sprayer before the time arrives for cessation thereof by the clock mechanism.

When the handle 35 is actuated to set the clock mechanism, the arms 32 and 40 are, as viewed in Figs. 3 and 5, moved in counterclockwise direction, a distance commensurate with the movement of the handle 35, in clockwise direction, as viewed in Fig. 1. When such movement is in excess of a 10 or 15-minute setting, the pin 31, carried by the arm 32, will leave the bifurcated lever 30. However, as the arms 32 and 40 are moved by means of the operation of the clock mechanism in a direction to open the switch, the pin will eventually enter the bifurcated lever 30 and move it to open position.

The rotor 10 rotates in counterclockwise direction as viewed in Fig. 2.

The fluid within the container D is, when the apparatus is working, drawn through the pipe 18 into the compressor chamber E and there mixed with the air drawn in through the nipple 19. The air is compressed and the air and fluid mixture discharged to the atmosphere from the chamber E.

The quantity of air admitted regulates the character of the spray discharge; that is to say, when the inlets 20 are closed by the screw 21, only fluid from the container D is admitted to the chamber E resulting in a "heavy" spray discharge. The more air admitted, the "finer" or "lighter" will be the resulting spray. Thus, by suitable adjustment of the screw 21, a spray of desired consistency may be effected.

The more air that is admitted in the air stream causes creation of smaller droplets in the spray, while less air admitted causes the creation of larger droplets. The smaller droplets are utilized in killing flying insects such as flies, while the larger droplets are better for killing crawling insects such as roaches, bugs and the like. It will be observed that the size of the liquid droplets may be readily varied by varying the amount of air supplied in the air stream admitted to the compressor.

An advantage is derived by use of the angularly adjustable discharge nozzle, in that the sprayer may be placed in any convenient position and the nozzle inclined to direct the spray discharge in direction most advantageous for the work at the moment. This feature is useful when the sprayer is used for fumigation or disinfection purposes, as the nozzle may be so positioned as not to direct the spray against anything that thereby might be damaged.

Construction of the timer and switch mechanism, whereby the motor may be cut out of circuit, manually, while the clock is running, has its advantages. For instance, it might be desirable to move the sprayer from one room to another, while the clock is running. The switch may be opened, the sprayer moved to another place of use, and the handle 35 actuated to close the switch and thus return the later opening of the switch to the clock mechanism.

The term "insecticide" is used generically in the claims and not by way of limitation, and includes all fluids of such characteristics as will readily atomize.

The contour of the compressor chamber walls, as fashioned, is such that the portion of the wall contacted by the rotor 10, between the outlet and inlet, in the direction of rotation of the rotor, which is counterclockwise as viewed in Fig. 2, is arcuate, so that there is bodily engagement of the rotor against such part of the wall. For the purpose of clarity, the angular arrangement of the inlet and outlet of Figure 1, is shown differently from what it actually is, as illustrated in Figure 2.

The invention has been described herein more or less precisely as to details, yet it is to be understood that the invention is not to be limited thereby, as changes may be made in the arrangement and proportion of parts and equivalents may be substituted without departing from the spirit and scope of the invention.

The invention is claimed as follows:

1. An insecticide sprayer of the air compressor type, including in combination a motor casing, a compressor casing providing a compressor chamber, and a fluid container receiving means in vertical axial alignment with the motor casing and therebeneath, a container for liquid removably supported by said container receiving means, an electric motor in said motor casing and compressor means in said compressor chamber, connections between the motor and said compressor means for operating the latter, air inlet means to said compressor chamber, means providing fluid communication between the interior of said container and said air inlet means prior to entrance of air into said compressor chamber, means for directing air and fluid from said compressor chamber, and means for regulating the amount of air delivered to said chamber, by said air inlet means.

2. A single unit hand portable insecticide sprayer of the air compressor type, including in combination, a container for insecticide, means providing a compressor chamber, compressor means in said chamber, means for supplying air to said chamber, discharge means communicating with said chamber, means providing fluid entry from said container into said air supply means prior to the entry of air into said chamber whereby said fluid is drawn into said air supply solely by suction, and manually operable means for regulating at will the amount of air delivered to said chamber by said air supply means, said container, chamber and compressor means being assembled as a unit structure for compactness and portability.

3. In a method of killing insects by vapor contact in a closed space such as a room, the steps of mixing air and undiluted liquid insecticide at room temperature, thereafter delivering such mixture into a compressor chamber and therein mechanically compressing the air to atomize and heat the liquid insecticide, and then by the compressed air projecting the atomized insecticide into the atmosphere of said space.

4. In a method of killing insects by vapor contact in an enclosed space such as a room, the steps of, confining and continuously moving a stream of air, injecting liquid insecticide at room temperature into said moving air stream prior to air compression, and thereafter compressing the air to atomize and heat the insecticide and discharge it to the atmosphere of said space in the form of spray.

5. A hand portable insecticide sprayer, comprising a unitary compact structure having in assembled relation a rotary compressor including a compressor chamber provided with a suction intake and a discharge outlet, a motor for driving said compressor, an air inlet conduit in communication with the suction intake of the compressor, valve means in said conduit to regulate the passage of air therethrough, a container for insecticide having a discharge conduit opening into said air inlet conduit, whereby a mixture of air and insecticide is fed to the compressor chamber to be compressed and heated therein.

6. In a method of killing insects by vapor contact in an enclosed space such as a room, the steps of, confining and continuously moving a stream of air, then solely by suction injecting liquid insecticide at room temperature into said moving air stream prior to air compression, and thereafter compressing the air to atomize and heat the insecticide and discharge it to the atmosphere of said space in the form of spray.

ADAM A. BREUER.